May 9, 1950        T. P. GIBLIN        2,506,664
IGNITION SYSTEM

Filed Oct. 15, 1948                         2 Sheets-Sheet 1

INVENTOR.
Thomas P. Giblin
BY Kenway Jenney, Witter & Hildreth
Attys.

May 9, 1950 T. P. GIBLIN 2,506,664
IGNITION SYSTEM
Filed Oct. 15, 1948 2 Sheets-Sheet 2
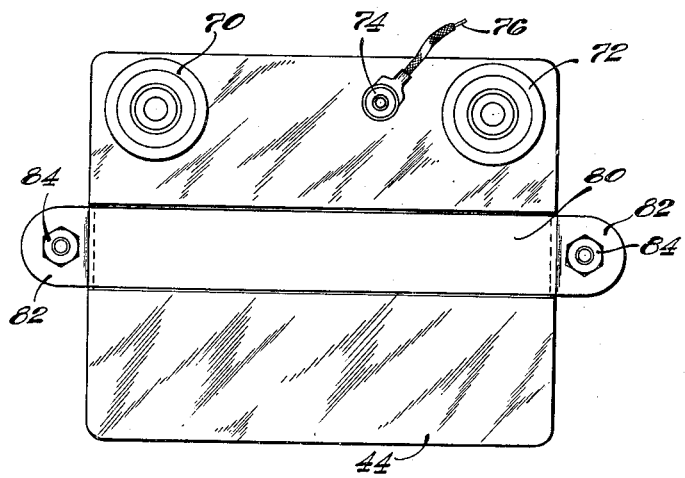
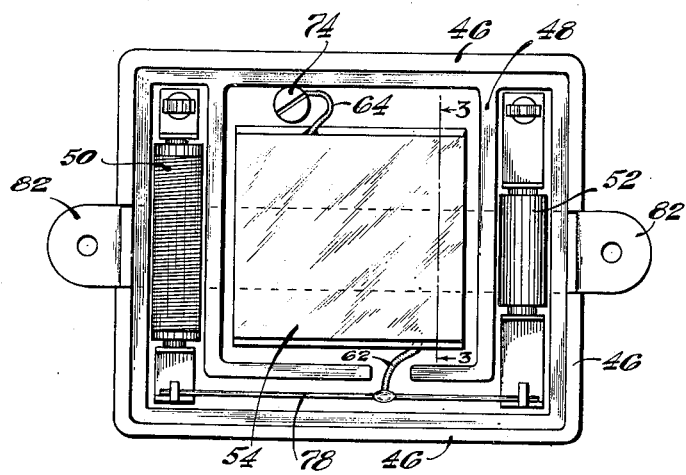
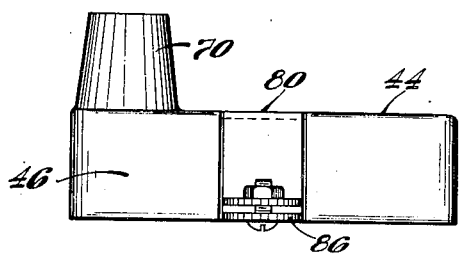
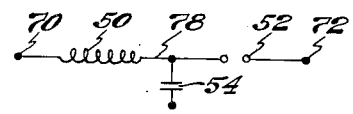
INVENTOR.
Thomas P. Giblin Patented May 9, 1950

2,506,664

UNITED STATES PATENT OFFICE 2,506,664

IGNITION SYSTEM

Thomas P. Giblin, Pawtucket, R. I., assignor to G. A. Swanson Engineering Co., West Warwick, R. I., a corporation of Rhode Island Application October 15, 1948, Serial No. 54,765

3 Claims. (Cl. 315—219)

My invention relates to ignition systems employed in conjunction with internal combustion engines.

A constant source of trouble encountered in the course of operating internal combustion engines resides in the fouling of the spark plugs. In the course of time sufficient carbon is deposited adjacent the terminals to form a relatively low resistance path shunted across the spark gap. When that happens the firing charge leaks through the carbon without effecting an igniting spark for the explosive mixture in the cylinder. Although it has been proposed to overcome this difficulty by incorporating an energy storage device in the circuit, no practically satisfactory solution of the problem has yet been presented.

The most important object of my invention is to improve the efficiency and reliability of ignition systems for internal combustion engines.

Another object of the invention is to improve ignition systems for internal combustion engines and specifically to prevent the fouling of the spark plugs.

In one aspect my invention comprises an improved circuit for the ignition system of an internal combustion engine, while in another aspect my invention comprises a compact unit containing most of the elements of the circuit and adapted for installation on existing ignition systems of conventional design.

An important feature of the invention resides in the combination of a condenser, a spark gap and a choke coil connected between the transformer and the spark plug and arranged always to provide a fat spark at the spark plug terminals, regardless of the condition of the plug.

Figure 1:
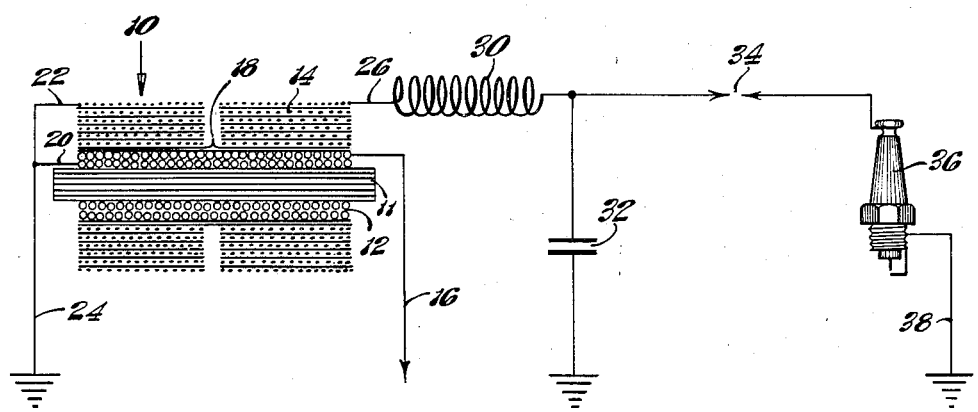
Figure 2:
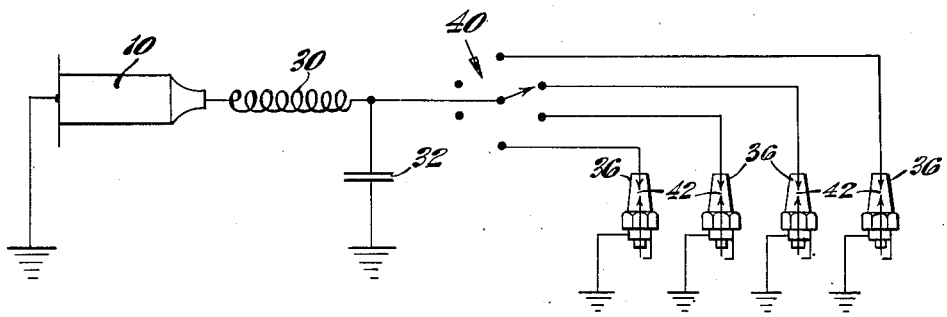
Figure 3:
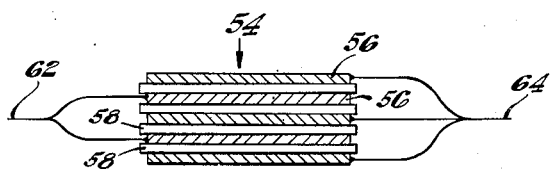

These and other objects and features of the invention will be more readily understood and appreciated from the following detailed description of a preferred embodiment thereof selected for purposes of illustration and shown in the accompanying drawings, in which:

Fig. 1 is a schematic circuit diagram embodying my invention as applied to a single spark plug, Fig. 2 is a schematic circuit diagram illustrating the application of the principles of the invention to a plurality of spark plugs, Fig. 3 is a view in transverse cross section through the condenser along the line 3—3 of Fig. 5, Fig. 4 is a plan view of a unit constructed in accordance with the invention, Fig. 5 is a bottom plan view of the unit with the filling material removed to show the arrangement of the elements, Fig. 6 is a view in side elevation of the unit, and Fig. 7 is a wiring diagram of the elements of the unit of Figs. 3–6.

As shown in Fig. 1 the circuit of my invention is combined with a conventional transformer of the sort ordinarily used to provide high voltage impulses to the spark plugs of an internal combustion engine. The transformer 10 is shown in longitudinal cross section and includes a core 11 formed of a bundle of soft iron wires. The primary of the transformer comprises a relatively small number of turns of relatively heavy gauge wire 12, while the secondary consists of a relatively large number of turns of smaller gauge wire 14, coiled as a plurality of concentric helices separated by layers of insulating material such as glassine paper. The secondary is formed as two spaced coils connected in series as shown at 18. One side of the primary coil 12 is provided with a lead wire 20 connected to ground through a cable 24 to which one side of the secondary coil 14 is also connected by means of a lead wire 22. The other side of the primary 12 is connected through a lead wire 16 to a source of low voltage pulses. The other side of the secondary 14 is connected through a lead wire 26 to an air core choke coil 30 which in turn is connected to the positive side of a condenser 32 and to one side of an air gap 34. The other side of the air gap 34 is connected to center terminal of a conventional spark plug 36 which is grounded in the cylinder block of the engine. In order to show a complete circuit, however, a wire 38 is shown connected to the outside terminal of the spark plug and to ground. The negative side of the condenser 32 is also connected to ground.

I have found that a condenser having a capacity of the order of 0.01 mfd. is suitable for my purpose and that the choke coil 30 may conveniently comprise a "7.5 meter choke."

The circuit shown in Fig. 1 is novel in view of the inclusion of the choke coil 30, since others have proposed to place a condenser and an air gap between the secondary of the transformer and the spark plug. Considering the circuit without the choke 30, it becomes obvious that a pulse from the transformer will be stored in the condenser 32 until the voltage reaches a value sufficient to jump the gap 34, at which time a very sharp high voltage pulse is applied to the spark plug. A pulse of this character will form a spark at the terminals of the plug regardless of the condition of the plug. That is to say, a very sharp high voltage pulse will jump across the air gap of the spark plug rather than traverse the low resistance path formed by deposited carbon. It might be thought that the circuit without the choke coil would be adequate but I have found as the result of many tests that in the absence of the choke coil the engine will not respond properly when the throttle is suddenly opened. Although an engine with fouled plugs will run smoothly at a steady rate, when the throttle is suddenly opened, the plugs will not fire properly and the engine will buck. However, when a choke coil is inserted between the secondary of the transformer and the condenser and air gap, the engine will respond smoothly as the throttle is opened and sudden changes in engine speed will have no effect on the firing of the spark plugs.

While I am not certain of the exact nature of the function of the choke coil in the circuit shown in Fig. 1, I believe that it serves to prevent leakage from the condenser back through the secondary of the transformer to ground. It is obvious that the secondary of the transformer 10 must have considerable capacity between its windings and would, therefore, afford a path for high frequency current to pass from the condenser to ground; by inserting the choke 30 between the transformer and the condenser, this leakage is prevented. The wavelength of the oscillations produced in the circuit will ordinarily lie between 5 and 10 meters; therefore, a 7.5 meter choke represents a judicious compromise.

The circuit shown in Fig. 2 differs from that shown in Fig. 1 only by the inclusion of a distributor 40 connected to the junction of the choke 30 and the condenser 32 and employed in conjunction with four spark plugs 36 in the upper portion of each of which there is provided an air gap 42. It has been proposed to employ a condenser and an air gap for each spark plug in an internal combustion engine, and it has been proposed also to employ a single condenser and a single air gap to serve all the spark plugs. I have found, however, that while it is possible to obtain satisfactory results with a single condenser connected as shown in Figs. 1 and 2 the results are slightly improved if a separate air gap is employed in connection with each plug. The optimum combination is a single condenser and a plurality of air gaps connected as shown in Fig. 2. I have made many tests of the various combinations referred to and find that for practical purposes a single condenser and a single air gap will produce satisfactory results at minimum costs.

In Figs. 3–6 I have shown a compact self-contained unit adapted for mounting at a convenient location with respect to an internal combustion engine of conventional design and adapted to convert it to embody my invention. To this end I provide a shallow rectangular casing of insulating material including a solid top wall 44 and side walls 46. Within the casing there is defined a small square chamber formed by integral walls 48 which also serve to define a long narrow rectangular chamber at either end of the casing. Within one of the end chambers I mount a choke coil 50, while an air gap 52 is mounted at the opposite end. The air gap comprises a pair of opposed terminals encased in porcelain and held in position between a pair of spring clips. The gap between the terminals is in the order of 0.064". In the center square chamber I dispose a condenser 54 constructed as best shown in Fig. 3 wherein five layers 56 of metal foil are separated by four glass plates 58. A wire 64 is connected to three alternate layers of foil 56 while a wire 62 is connected to the other two alternate layers of foil.

Formed in the top wall 44 of the casing is a pair of integral sockets 70 and 72 containing contact members or terminals of conventional design. One end of the choke coil 50 is connected to the terminal in the socket 70, and one side of the air gap 52 is connected to the terminal in the socket 72. I also provide a binding post 74 set in the top wall of the casing connected at its lower end to the wire 64 of the condenser 54 and connected at its other end to a wire 76 leading to ground. The other end of the choke 50 is connected to a bus bar 78 which runs longitudinally along the interior of the casing and is connected to the wire 62 from the condenser 54 and also to the other side of the air gap 52. The circuit connections are shown diagrammatically in Fig. 7. The socket 70 is adapted to receive a cable (not shown) leading to the secondary winding of the transformer while the socket 72 receives a cable (not shown) which leads to the center terminal of the distributor.

In order that the unit of my invention may conveniently be mounted upon the inside of the dashboard of an automobile or control board of a boat, I provide a recess running along the center of the top wall 44 and two side walls of the casing, suitably dimensioned to receive a long strap 80 having outturned flanges 82 at each end to receive bolts 84 by means of which the unit may be secured in desired position. I may also provide a bottom strap 86 which runs along the bottom of the casing and acts as a clamp to hold the elements firmly in position. However, I prefer to fill the interior of the casing with asphalt, pitch, or other suitable material which provides insulation for the elements within the casing and also serves as a matrix holding them firmly in proper position.

Various modifications of the embodiments herein shown will suggest themselves to those skilled in the art; it is not intended, however, to limit the invention to the preferred embodiments shown but rather to measure it in terms of the appended claims.

Having now described and illustrated a preferred embodiment of my invention what I claim as new and desire to secure by Letters Patent of the United States is:

1. An ignition circuit comprising a source of electric energy including a transformer, a spark gap, a spark plug connected in series with said spark gap, a capacitor connected in parallel with said spark gap and said spark plug, and a choke connected in series between the secondary of said transformer and said gap, plug, and capacitor.

2. An ignition circuit comprising a plurality of spark plugs, a spark gap connected in series with each spark plug, a capacitor connected in parallel across said gaps and plugs, a source of electric energy including a transformer, and a choke coil connected in series between the secondary of said transformer and said plugs, gaps, and capacitor.

3. Ignition system comprising a source of pulsed electric power including a transformer, a grounded sparking device, a spark gap and an inductance connected in series between said sparking device and the secondary of said transformer, and a capacitor connected between said gap and said inductance at one end and to ground at the other.

THOMAS P. GIBLIN.

REFERENCES CITED

The following references are of record in the file of this patent:

UNITED STATES PATENTS

| Number | Name | Date |
|---|---|---|
| 1,370,077 | Whisler | Mar. 1, 1921 |
| 2,276,966 | Hansell | Mar. 17, 1942 |
| 2,331,912 | Holthouse, Jr. | Oct. 19, 1943 |